Aug. 30, 1966   I. JEPSON ETAL   3,269,678
ELECTRIC MIXER
Original Filed Aug. 25, 1958
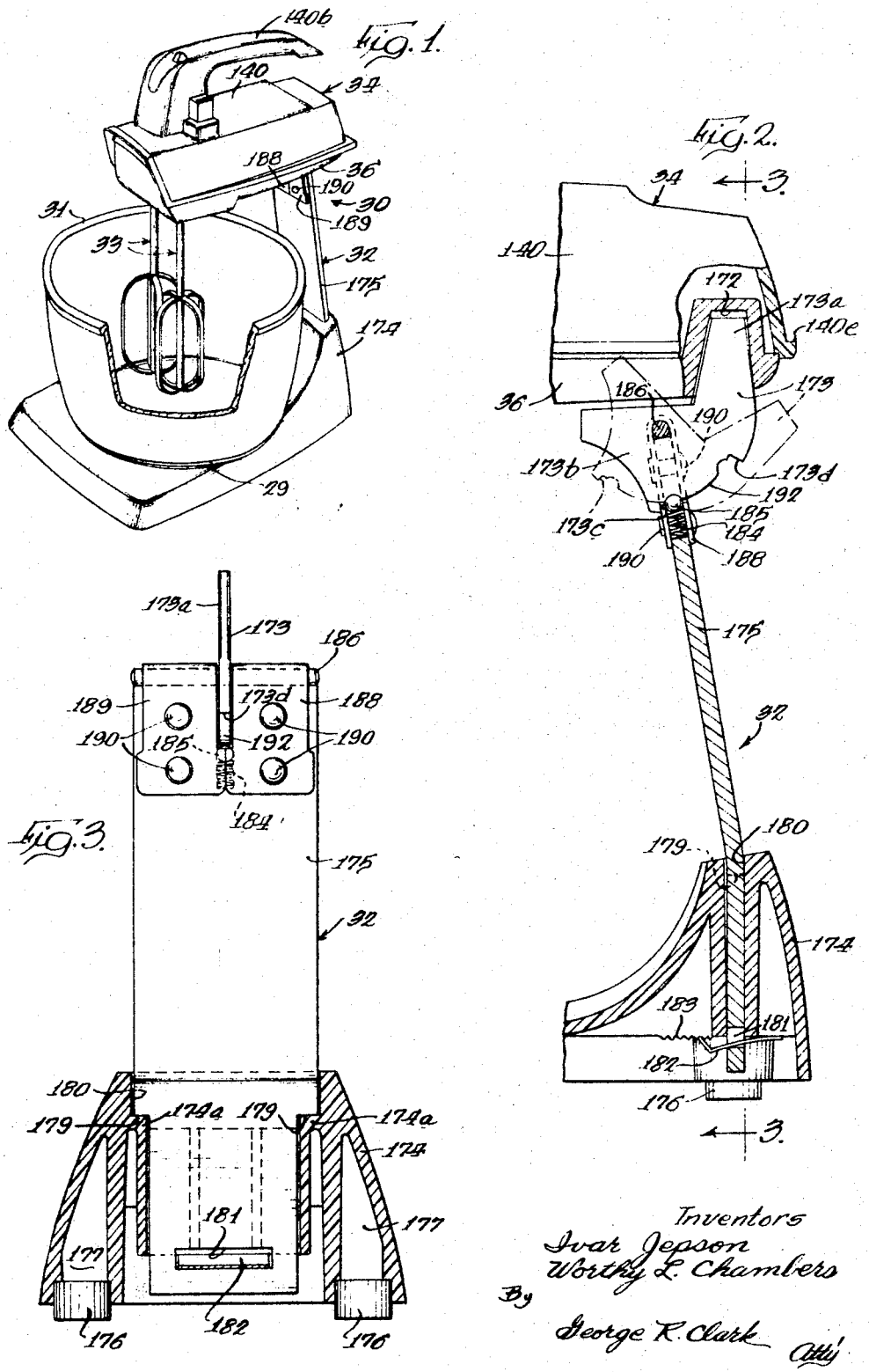
Inventors
Ivar Jepson
Worthy L. Chambers
By George R. Clark   Atty

United States Patent Office 3,269,678
Patented August 30, 1966

3,269,678
ELECTRIC MIXER
Ivar Jepson, South Duxbury, Mass., and Worthy L. Chambers, Wilmette, Ill., assignors to Sunbeam Corporation, Chicago, Ill., a corporation of Illinois
Application Sept. 20, 1962, Ser. No. 224,947, now Patent No. 3,198,490, dated Aug. 3, 1965, which is a division of application Ser. No. 756,853, Aug. 25, 1958, now Patent No. 3,077,340, dated Feb. 12, 1963. Divided and this application May 10, 1965, Ser. No. 454,399
6 Claims. (Cl. 248—13)

This application is a division of copending Jepson et al. application Serial No. 224,947, filed September 20, 1962, now Patent No. 3,198,490, granted August 3, 1965, which, in turn, is a division of a prior application, now Patent No. 3,077,340, granted February 12, 1963. This invention relates to electric mixers, and more particularly to relatively small compact household mixers used in food preparation.

The electric household mixing appliance or food mixer has become a standard and necessary tool of the housewife, and many millions of such mixers are in use today. Some of these household food mixers comprise a supporting stand with several mixing bowls and a mixing unit associated with the stand to perform a mixing operation. More recently there has been a demand for a small mixer which would involve a minimum storage problem in small apartments and the like. The mixer of Jepson Patent No. 2,987,636 is such a small mixer which has gone into extensive commercial use. Such small mixers were primarily intended to be held in the hand of the user during operation thereof. However, there has been a demand for such a small mixer which may also be supported on a stand for certain applications.

Accordingly, it is an object of the present invention to provide a new and improved electric household mixer.

It is another object of the present invention to provide a small household mixing unit with suitable supporting means for such unit when performing a mixing operation.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawing in which:

FIG. 1 is a perspective view of an electric mixer and supporting means thereof shown in a position for performing a mixing operation;

FIG. 2 is an elevational view partly in section illustrating details of the mixer stand or support means of the present invention including its association with the mixer unit; and FIG. 3 is a view taken along line 3—3 of FIG. 2.

The present invention accomplishes the objects set forth above in connection with a small hand operated mixer by providing a suitable support for supporting the mixer and an associated mixing bowl. This support is designed to permit one-hand assembly of the mixer therewith, and which support is simple and compact and presents a minimum problem as far as storage is concerned.

Referring now to the drawing wherein like reference characters designate corresponding parts throughout several views, there is shown a small household mixer generally designated by the reference numeral 30 which may be held in the hand of the housewife or other person while being used for a mixing operation to be performed in a suitable mixing bowl 31, or if desired, the mixer may be supported on a suitable stand generally designated at 32 having a turntable 29 for the bowl 31, which stand is described in more detail hereinafter. The mixer 30 includes the conventional beater elements 33 which are removable from an electrically motor driven unit contained in a suitable housing, which unit is generally designated by the reference numeral 34.

The power or motor driven unit 34 for driving the beaters 33 is fully described in Patent No. 3,077,340 and the disclosure of that patent is incorporated by reference herein. Briefly, the unit 34 comprises a motor base unit 36 for supporting all the elements of the power unit including the prime mover (not shown) which preferably is an electric motor. In order to complete the housing for the power unit 34, there preferably is provided a cover member 140 formed of a molded plastic material. The cover member 140 is preferably provided with an integral handle portion 140b to permit the user to grasp the same during a mixing operation.

In accordance with the present invention and in order that the motor unit 34 may be supported from the stand 32 in a manner so that the operator may support the unit from this stand or remove it therefrom with one hand, the base 36 of the power unit 34 is provided at the rear thereof with a narrow recess 172, best shown in FIG. 2 of the drawing. This recess is effectively a narrow slot having a uniform width in one dimension and a diverging cross section in the other dimension, as clearly shown in FIG. 2 of the drawing. The edges along the diverging dimension are V-shaped to provide a centering and stabilizing effect on cooperating means described hereinafter. This recess accommodates a correspondingly shaped portion 173a of a pivotal member 173, best shown in FIGS. 2 and 3 of the drawing, which has beveled edges cooperating with the V-shaped edges of the recess 172. The beveled edges and diverging configuration insure a readily separable but stable support. The pivotal member 173 is pivotally mounted at the upper end of the stand 32, which stand includes a platform 174 supporting an upright member 175 suitably secured thereto. The platform 174 of the stand 32 is preferably a molded plastic member supported on a plurality of feet 176 which may comprise cylindrical rubber or resilient members inserted in suitable recesses such as 177 defined in the platform 174. The platform 174 supports the turntable 29 in the conventional manner so that the bowl 31 may be rotated with the turntable 29 relative to the platform 174.

The upright 175 preferably comprises a metal strip having defined near the lower end a pair of shoulders 179. The upright 175 is inserted into a slot 180 molded in the platform 174 until the shoulders 179 thereof engage cooperating ledges 174a defined within the slot or recess 180.

The lower end of the upright 175 is provided with an elongated opening 181 therethrough for receiving a suitable resilient clamping means 182 which engages against the underside of the platform 174. As illustrated in FIG. 2, the underside of the platform is provided with sort of ratchet teeth 183, and the resilient member 182 is pushed through the opening 181 and prevented from coming out by the ratchet teeth 183. This arrangement forces the shoulders 179 into engagement with the ledges 174a and secures the upright 175 to the platform 174 in a very simple but effective manner.

For the purpose of pivotally supporting the member 173 from the upper end of the upright 175, the upright is effectively bifurcated at the upper end by a suitable slot within which is received a compression spring 184 and a spherical member 185. A suitable shaft 186 extending through an opening defined in the pivotal support 173 is disposed along the upper end of the upright 175, as clearly shown in FIG. 3 of the drawing, with a portion 173b of the pivotal support 173 disposed in the slot and having an edge thereof engaged by the spherical member 185 which is biased toward the pivotal member 173 by the spring 184. For the purpose of holding the shaft 186, the pivotal member 173, the spherical member and the spring 184 assembled to the upright 175, there are provided a pair of U-shaped plate members 188 and 189 which are secured by suitable rivets 190 in the manner clearly indicated in FIGS. 2 and 3 to the upper end of the upright 175. The pivotal member 173 is provided with a pair of spaced shoulders 173c and 173d at the lower edge defining a notch 192 therebetween. The notch 192 has a curvilinear configuration and is provided with slight indentations at either end to form detents for the reception of the spherical member 185, thus selectively locking the pivotal member 173 in either the solid line position of FIG. 2 or the dashed line position there shown. In the solid line position, the power unit 34 is supported for the well-known mixing operation shown in FIG. 1 of the drawing. The dashed line position will cause the mixer to be supported in a nonmixing position to afford the housewife access to the bowl 31, which may then readily be removed. It will be understood that the shoulders 173c and 173d limit the extremes of pivotal movement of the member 173.

In view of the detailed description included above, the operation of the present invention will readily be understood by those skilled in the art and no further discussion thereof is included herewith.

While there has been illustrated and described a single embodiment of the mixer unit of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. Support means for a household food mixer of the type including a power unit drivingly connected to beater elements depending therefrom, comprising, a base, an elongated upright member extending from said base, means for securing said upright member to said base, a movable member mounted for pivotal movement to the upper end of said upright member and having a projection for supporting said power unit, said projection comprising a thin flat member of varying width, and hinge means interconnecting said upright member and said movable member.

2. Support means as defined in claim 1 wherein said hinge means includes a shaft pivotally interconnecting said upright and said member.

3. Support means as defined in claim 1 wherein said projection has substantially a uniform thickness and a varying width along the length thereof with the narrowest portion of said width at the end of said projection.

4. Support means as defined in claim 3 wherein the edges of said projection along said varying width are V-shaped and said projection is adapted to be received in a correspondingly shaped slot in the power unit to provide centering and stability to the power unit supported on the projection.

5. Support means for a household food mixer of the type including a power unit drivingly connected to beater elements depending therefrom, comprising a base provided with an upwardly extending slot extending therethrough and defining ledges at the upper edges of said slot, an elongated upright extending through said slot and provided with a pair of shoulders near its lower end engaging respective ones of said ledges to position said upright, said base being provided with ratchet teeth defined in its underside near said slot, said upright being provided with an elongated opening near its lower end extending below said base, and resilient clamping means extending through said opening engaging against the underside of said base against said ratchet teeth.

6. Support means as defined in claim 1 wherein one of said members is provided with notches, and detent means on the other of said members operatively engaging said notches to lock said movable member in selected positions.

References Cited by the Examiner
UNITED STATES PATENTS

| | | | |
|---|---|---|---|
| 2,168,912 | 8/1939 | Meyer | 248—160 X |
| 2,202,724 | 5/1940 | Bean | 248—13 |
| 2,247,707 | 7/1941 | Jordan | 259—104 |
| 2,303,553 | 12/1942 | Humphreys | 248—13 |
| 2,529,120 | 11/1950 | Wallach et al. | 248—121 |
| 3,170,674 | 2/1965 | Gomersall et al. | 259—1 |

CLAUDE A. LE ROY, *Primary Examiner.*

J. PETO, *Assistant Examiner.*